April 20, 1937.   J. H. WINDEMULLER   2,078,169
GAS OVEN
Filed June 10, 1936
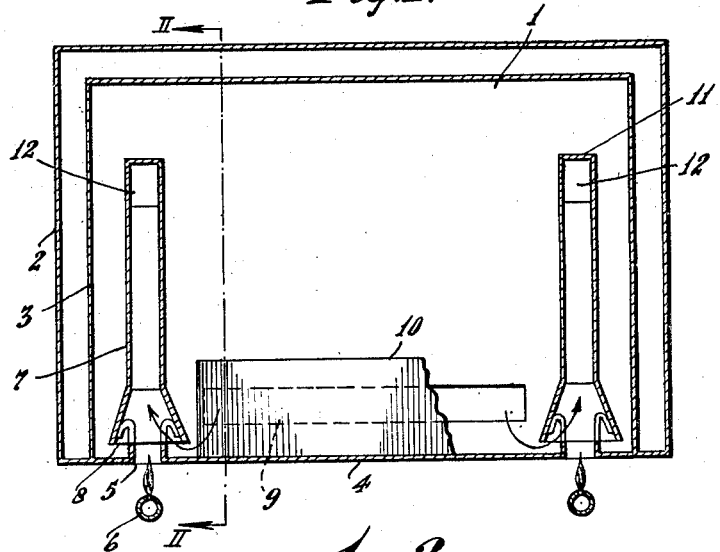
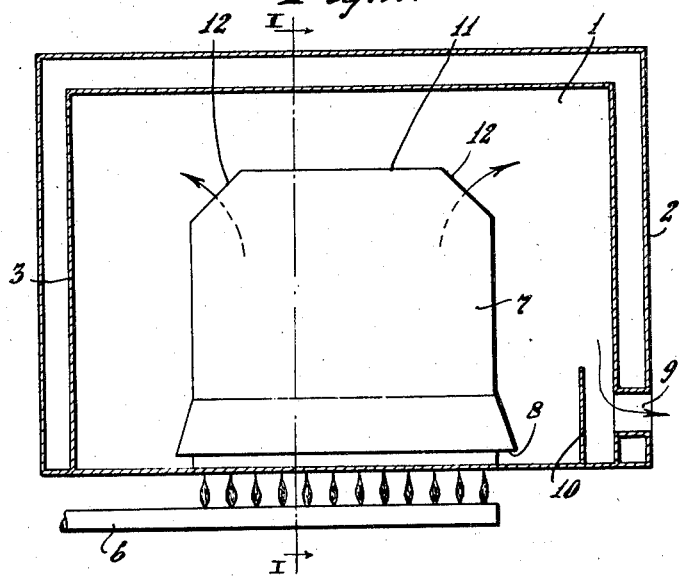
Inventor:-
Jan Hendrik Windemuller
By:- Cox & Moore attys.

Patented Apr. 20, 1937

2,078,169

UNITED STATES PATENT OFFICE 2,078,169

GAS OVEN

Jan Hendrik Windemuller, The Hague, Netherlands, assignor to Maatschappij van Berkel's Patent N. V., Rotterdam, Netherlands, a corporation of the Netherlands Application June 10, 1936, Serial No. 84,527
In the Netherlands May 15, 1935

3 Claims. (Cl. 126—273)

The efficiency of gas ovens is ordinarily decreased by loss of heat caused by the conduction of heat to the walls of the oven and by the withdrawal of the combustion gases from said oven. The heat of these gases is partially absorbed by the walls which diminish the heat in the oven space. The gases discharged from the oven space also carry with them a substantial amount of heat which must be replaced by hot combustion gas delivered to the oven space.

Since these discharged gases have a far lower temperature than the gases in the oven space the transfer of heat to the walls along which the escaping gases flow will be diminished.

The efficiency of gas ovens moreover is greatly dependent on a regular circulation of the hot combustion gases in the oven space.

Ordinarily the ascending gases create a strong draught in the chimney, so that a large amount of cold air is drawn in and discharged into the oven space.

The present invention has for its purpose to obviate the drawbacks described above.

According to the invention chimneys are provided with draught guiding members along which air and gases from the heating space may be drawn into the chimney. This will greatly improve the circulation in the heating space, so that a uniform temperature will prevail all through the same, which makes the heating space as a whole more suitable for baking and other processes based upon heating, for which processes in the gas ovens hitherto known only a given zone could be utilized.

According to the invention a partition is provided between the discharge opening arranged in or near the bottom of the heating space and the draught guiding member thus preventing direct communication between the same.

According to the invention the chimneys are closed at the top and are provided with discharge openings in one or more of the side walls to retard the air current and thereby facilitate the heating of the air.

When carrying out the measures described above it will be made possible that the openings in the bottom of the heating space, the chimneys and/or the gas burners are shorter than the dimensions of the heating space measured in the same direction, which will result in the advantage that if the burners are turned low, considerably less cold air will be drawn in.

The invention will now be further explained with the aid of the drawing illustrating an embodiment of the invention intended for a baking oven.

Fig. 1 is a diagrammatical vertical section through the oven on line I—I of Fig. 2.

Fig. 2 is a section according to the line II—II in Fig. 1.

The baking space 1 of the oven is enclosed by a double wall 2, 3. In the bottom 4 of the baking space there are provided openings 5, below which there are located the gas burners 6. Chimneys 7 extending high into the baking room are mounted on the base 4 of the oven and are operatively connected with the openings 5, which chimneys near their lower ends are provided with a draught guiding member 8. In the rear wall of the baking room there is provided a discharge opening 9. Between the discharge opening 9 and the draught guiding member 8 there is arranged a partition 10, in order to prevent direct communication between the same.

The warm air settling between the partition 10 and the wall will flow out of the opening 9, thus enabling additional heated air to enter the oven through the openings 12. The heated air in the oven flows downwardly adjacent the chimneys 7 and then upwardly through the draught guiding member 8 where it is reheated, thereby maintaining a constant circulation of hot air in the oven, caused primarily by the upward flow of the heated air in the chimney 7. The outwardly extending sides of the guiding member 8 serves to conduct the air somewhat remote from the chimney into the chimney and accelerates the flow of the air.

The hot combustion gases from the gas burners 6 rising up in the chimneys 7 will create a draught in said chimneys, by which draught the gases and air from the baking room flowing past the draught guide 8 will be drawn along, which will produce an intensive circulation of said gases and air through the entire baking space. Since only the combustion gases and hardly any air are introduced into the baking space, only a very small quantity of gases and air will have to be discharged from the said baking space. The passage of air and gases through the baking space and the accompanying losses of heat may therefore be kept very low.

Due to the fact that the chimneys are closed at their tops by a wall 11, and openings 12 for the discharge of the combustion gases are provided in the side walls, the hot gases discharged by the same are given a direction which is highly favourable to a uniform distribution of heat throughout the entire baking room.

Between the discharge opening 9 and the draught interrupting members 8 there is provided a partition 10, which serves to separate the current of exit air from the current which is drawn into the chimney 7.

I claim:

1. A baking oven comprising end and side walls, a top, and a base one of said walls being provided with a flue opening near the bottom thereof, said base being provided with an opening, a heating element operatively positioned below said opening, an air heating chimney mounted in the oven and spaced above said opening and remote from the walls whereby said chimney receives air from the inside of the oven for reheating and from the outside of the oven for initial heating.

2. In combination with a chimney for a gas oven as set forth in claim 1, of a draught guiding member surrounding the lower end of the chimney, whereby air is directed into the base of the chimney.

3. A baking oven comprising end and side walls, a top, and a base, said base being provided with an opening, an air heating element operatively positioned below said opening, a chimney in said oven positioned and spaced above said opening, one of said walls having a discharge opening at the lower part thereof to provide an exit for the air, and a partition in proximity to the discharge opening extending longitudinally thereof and arranged to separate the exit current of air from the current which is drawn into the chimney.

JAN HENDRIK WINDEMULLER.